United States Patent [19]
Worzel et al.

[11] Patent Number: 6,118,732
[45] Date of Patent: Sep. 12, 2000

[54] SECURE MARINE COMMUNICATION SYSTEM

[75] Inventors: John Lamar Worzel, Palisades; Alan Berman, Dobbs Ferry, both of N.Y.

[73] Assignee: The United States of America as represented by the Secretary of the Navy, Washington, D.C.

[21] Appl. No.: 03/792,933

[22] Filed: Feb. 12, 1959

[51] Int. Cl.[7] .................................................. H04B 11/00
[52] U.S. Cl. ............................................................. 367/134
[58] Field of Search .................................. 340/4, 5, 6, 2, 340/3, 11; 181/51; 367/131, 132, 134

[56] References Cited

U.S. PATENT DOCUMENTS

| | | | |
|---|---|---|---|
| 1,662,247 | 3/1928 | Hahnemann et al. | 181/125 |
| 1,690,579 | 11/1928 | Hammond, Jr. | 367/137 |
| 2,587,301 | 2/1952 | Ewing | 367/127 |
| 2,868,311 | 1/1959 | Tullos | 367/912 |
| 4,203,164 | 5/1980 | Isaak et la. | 367/134 |

*Primary Examiner*—Daniel T. Pihulic
*Attorney, Agent, or Firm*—Michael J. McGowan; Prithvi C. Lall; Michael F. Oglo

[57] ABSTRACT

This invention relates to a secure marine communication system and especially to a sonic communication system utilizing the so-called "sound channel" in the ocean deeps.

The propagation of sound in sea water is known to occur along rays which are subject to refraction by variations in sound velocity. In most areas of the oceans, the velocity of sound varies with depth and temperature, and is less at some intermediate depth than it is either at the surface or at the ocean bottom. These oceanographic conditions produce a "sound channel" having at/its horizontal axis a level along which the velocity of sound reaches its minimum value. Essentially, the sound channel provides for a long-range transmission of sound between a sound source and a receiver where both types of sonic equipment are located at a level approximately corresponding to the axis of minimum velocity.

20 Claims, 3 Drawing Sheets

SECURE MARINE COMMUNICATION SYSTEM

This invention relates to a secure marine communication system and especially to a sonic communication system utilizing the so-called "sound channel" in the ocean deeps.

The propagation of sound in sea water is known to occur along rays which are subject to refraction by variations in sound velocity. In most areas of the oceans, the velocity of sound varies with depth and temperature, and is less at some intermediate depth than it is either at the surface or at the ocean bottom. These oceanographic conditions produce a "sound channel" having at/its horizontal axis a level along which the velocity of sound reaches its minimum value. Essentially, the sound channel provides for a long-range transmission of sound between a sound source and a receiver where both types of sonic equipment are located at a level approximately corresponding to the axis of minimum velocity.

Considering the bathic aspects of the sound channel in greater detail, it is found that in going from a point just below the surface of sea water to increasingly greater depths, there occurs a decrease in temperature and a corresponding decrease in sound velocity. This effect continues through depths ranging from 675 to 700 fathoms. In this region, a minimum sound velocity level is reached beyond which little further temperature change is observed. Below the minimum velocity level, increasing pressure, with increasing depth, causes the velocity of sound to increase gradually at a relatively slower rate compared to its rate of decrease, and ultimately at very great depths of 2000 to 3000 fathoms to regain and exceed the initial velocity present just below the ocean surface.

Therefore, from a refraction point of view, variation of velocity with temperature may be regarded as forming an upper side or "roof" for the sound channel; variation of sound velocity with pressure may be regarded as forming a lower side or "floor" for the sound channel. It should also be observed that the so-called roof or upper side of the sound channel is located away from the axis of the channel a distance much less than the distance between the axis and the lower side or floor of the channel.

It has been discovered that a bathic sound channel may be utilized as a refracting medium to achieve two important objectives. One is the separation of a source of sound energy into a series of successively occurring sound impulses which are characterized by progressively greater intensity, leading up to an abrupt and highly identifiable endpoint. A second objective is to prevent loss of sound energy due to reflection of sound rays at the surface or bottom of the ocean, and thus to provide for long-range sound transmission.

Since the minimum sound velocity axis occurs at a relatively great depth (approximately 700 fathoms), there is provided above and below this level a distance through which a limited number of sound rays may be refracted and completely turned back without ever reaching the surface or bottom of the ocean, thereby to furnish continuous paths along which it is believed that sound impulses may traverse great distances. This span of distance above and below the minimum sound velocity axis is hereinafter referred to as the "oceanic deep sound channel", the "deep sound channel", or the "sound channel".

One of the major unsolved problems in undersea warfare is communication between two submarines that are separated by distances of the order of 50 miles, in a manner which is undetectable by a nearby enemy submarine. It is obvious that such a communications system would be invaluable to a defensive line based on submarines employing passive detection techniques.

In cases where radio silence must be maintained, the communication would have to be purely sonic. It is here that the deep sound channel offers interesting possibilities. If a source situated at the axis of the deep sound channel is caused to radiate, then that fraction of the sound radiated into a narrow cone whose axis coincides with the sound channel axis will be propagated great distances with negligible attenuation.

Such a cone of propagated energy may be obtained by using a linear vertical transmitting array composed of non-directional transducers.

A typical embodiment of the present invention includes antennas comprising directionally sensitive transducer arrays at the transmitting and receiving ends of the communication system, and, preferably, a filtering circuit at the receiving end.

An object of the present invention is to provide a system by which two vessels may communicate with each other with little danger of message interception by other vessels.

Another object is to provide a secure communication system for underseas craft.

Other objects and many of the attendant advantages of this invention will be readily appreciated as the same becomes better understood by reference to the following detailed description when considered in connection with the accompanying drawings wherein.

Figure 1:
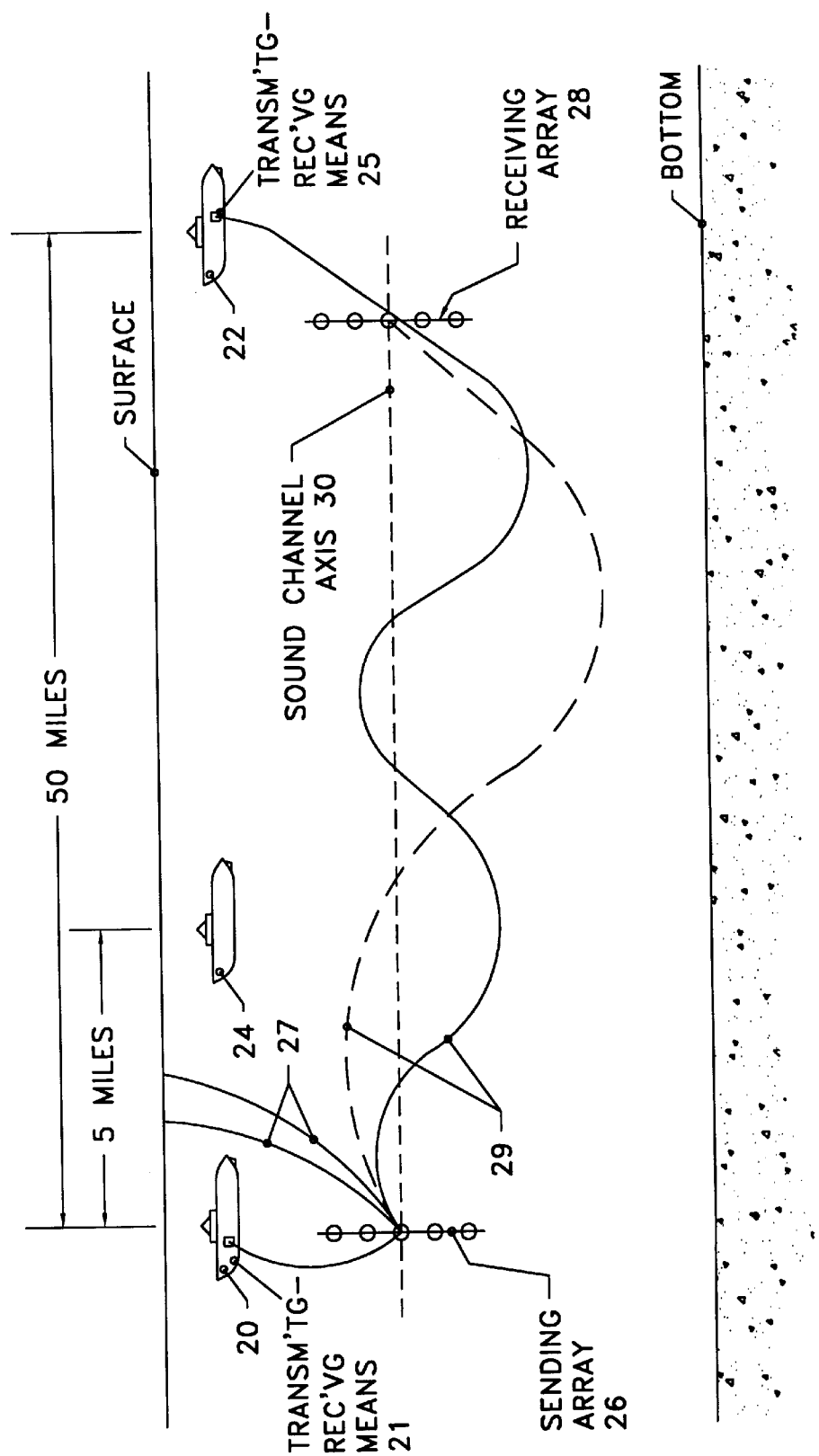
FIG. 1 is a schematic illustration of a typical operational situation in which the invention is useful.

Consider the situation shown in FIG. 1. Submarines 20 and 22 are friendly submarines separated by a distance of about fifty miles, for example. Submarine 24 is an enemy submarine operating at a distance of perhaps five miles from submarine 20.

Submarines 20 and 22 have transducer arrays 26 and 28 which have been lowered to the depth of the sound channel axis 30 and submarine 20 transmits a signal most of the energy of which is confined to a conic volume within the sound channel. Submarine 24 can only be aware that a/message is being transmitted if the small part of the signal which escapes from the sound channel in-sufficiently great to override the noise background in its-receiver. For example, if an array radiates 95% of its total power into the sound channel, only 2.5% will reach areas in which an unfriendly submarine could detect it. The 2.5% of the energy is represented in FIG. 1 by rays 27; the rest of the energy is represented by the rays 29 which are refracted completely within the deep sound channel.

Figure 2:
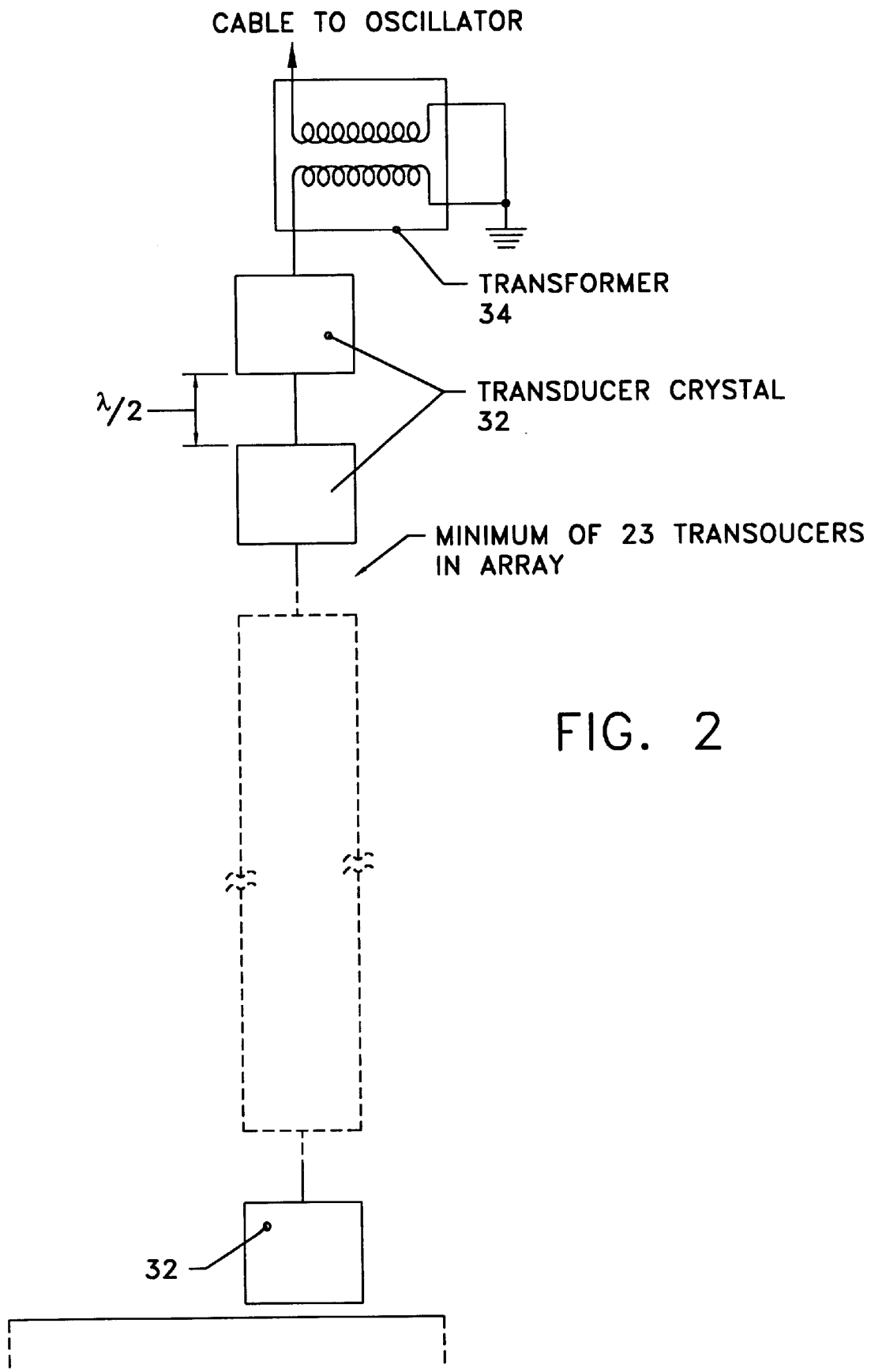
FIG. 2 is a diagrammatic representation of a transducer array, partially broken away, employed in this invention.

FIG. 2 shows the arrangement of a directionally sensitive, linear vertical transducer array which may be employed in the present invention. The array is composed of a plurality of non-directional transducers 32, such as cylindrical barium titanate crystals, linked together at half-wave intervals. The array is connected by a cable to the necessary power oscillators of the transmitting-receiving means 21 in the submarine through a transformer 34. The cable to the oscillators may be a stainless steel, insulated wire of about ⅛ inch diameter. The entire array is a flexible unit of about 30 to 40 feet if approximately 23 transducers are used.

The transmitting-receiving means 21 may comprise conventional communications equipment for converting sound into electrical signals which can be utilized to drive the sonar transducers in the transmitting array and for reconverting the electrical signals generated by the sonar transducers in the receiving array into sound or other intelligible indications.

A 1500 cps, 20,000 volt electrical signal, for example, may be used to drive the crystals. If the transformer 34 has a step-up ratio of 20 to 1, the oscillator must put out a 1000 volt driving signal. Two hundred watts of input power to the array is adequate for a minimum range of 50 to 100 miles.

Figure 3:
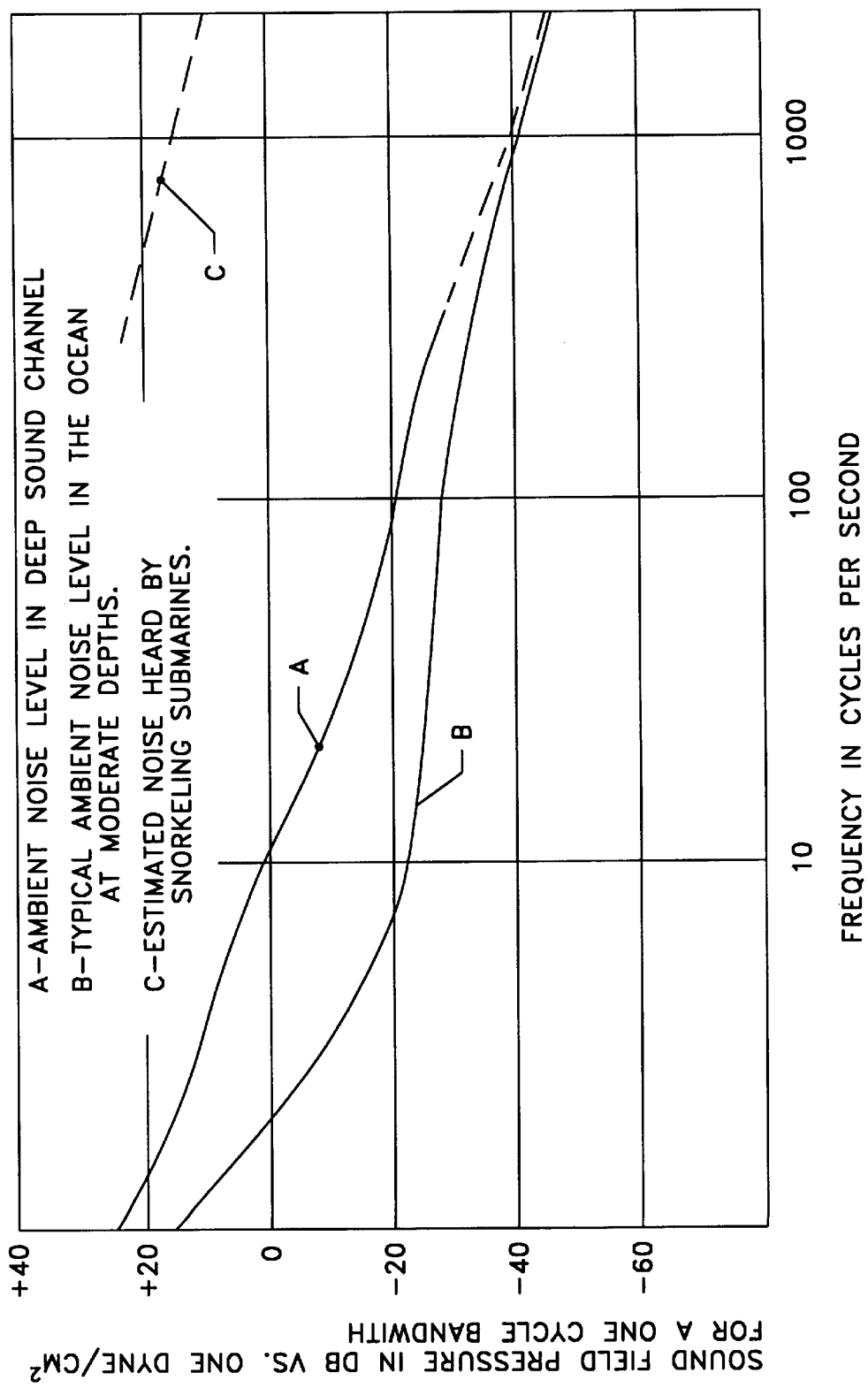
FIG. 3 is a graph of the background noise level spectra in the deep sound channel and at moderate depths in the ocean.

The 1500 cps frequency for the communication system is partially dictated by the fact that the utility of a sound channel communication system depends critically upon the background noise levels involved. In FIG. 3, curve B illustrates an idealized ambient-noise field intensity spectrum (i.e., typical noise levels over a range of sonic frequencies) at moderate ocean depths. This curve is based on measurements by several investigators. A reasonable assumption is that the noise level seen by a submarine cruising near the surface will be about 50 decibels (db) above this level, as indicated by curve C. Curve A shows the background noise level to be expected in the deep sound channel. It will be noticed that in the region from 5 to 50 cps the level of background noise in the sound channel is about 30 db higher than that outside the channel, while in the region above 1000 cps, the background noise in the channel does not appreciably differ from that hear the surface. This improvement of noise level in the sound channel above 1000 cps, together with considerations of attenuation as a function Of frequency and the desire to have a short array for ease of handling, dictate a choice of transmitted frequency in the 1000–2000 cps range.

The use of an array rather than a non-directional antenna is demanded by the figures given in Table 1 below.

TABLE 1

Number of elements in array of non-directional, equally excited, transducers spaced at half wave length intervals vs percent of total power radiated into sound channel.

| N | E |
|---|---|
| 15 | 90.46% |
| 21 | 92.05 |
| 27 | 94.77 |
| 33 | 95.22 |
| 39 | 95.61 |
| Non-directional | 20.79 |

E denotes the percentage of total radiated power which is confined to the sound channel (i.e., is useable for communication purposes) and N denotes the number of elements in the array. It is clear that for equal radiated power, an array has an inherent efficiency for sound channel communication which is between 4½ and 5 times as great as that of a non-directional radiator.

The number of transducer elements in the array is determined by the amount of secrecy desired, i.e., by the maximum amount of power which can be radiated out of the sound channel without overriding the back-ground noise level at the receiver of an unfriendly submarine travelling somewhere near the surface. If an array with 21 elements is employed, about 4% (see Table I) of the total power is radiated toward the surface toward unfriendly vessels. (It is assumed that corresponding energy radiated downward is not appreciably reflected from the ocean bottom). However, the energy is radiated in several lobes so that at any given distance from the array the amount of energy received is considerably less than the 4% figure given above. If the total radiated power is in the neighborhood of 200 watts, it has been found that a minimum number of 23 elements provides satisfactory security for a communicating vessel.

At the receiving vessel, the signal-to-noise ratio is considerably improved by the use of a receiving array, and since the receiving vessel 22 will, in its turn, wish to transmit signals, the same type of array as employed by the transmitting vessel 20 should be available, the array being connected by cable to the transmitting-receiving means in the receiving vessel 22.

Further improvement in the signal-to-noise ratio at the receiving vessel 22 can be obtained through the use of a conventional band-pass filter in the receiver, the filter acting to limit amplification of any frequencies except a small frequency band centered around the transmitted frequency, 1500 cps, thereby eliminating the amplification of background noise outside of the pass band.

Obviously many modifications and variations of the present invention are possible in the light of the above teachings. It is therefore to be understood that within the scope of the appended claims the invention may be practiced otherwise than as specifically described.

We claim:

1. A communication system for secure, long-distance communication between marine vessels comprising, in combination: means for generating electrical signals of a predetermined frequency; a transducer array disposed within the oceanic deep sound channel for transforming said electrical signals into sonic analog signals and radiating said sonic signals in a directional beam within the sound channel; and means disposed within the sound channel for receiving said sonic signals and converting them into electrical analog signals.

2. A communication system for secure, long-distance communication between marine vessels comprising, in combination: means for generating electrical signals of a predetermined frequency; a transducer array disposed near the axis of the oceanic deep sound channel for transforming said electrical signals into sonic analog signals and radiating said sonic signals in a directional beam within the sound channel; and means adapted to be disposed near the axis of the sound channel for receiving said sonic signals and converting them into electrical analog signals.

3. A communication system for secure, long-distance communication between marine vessels comprising, in combination: means for generating electrical signals of a predetermined frequency within the 1000 to 2000 cycle per second range; a transducer array disposed within the oceanic deep sound channel for transforming said electrical signals into sonic analog signals and radiating said sonic signals in a directional beam within the sound channel; and means disposed within sound channel for receiving said sonic signals and converting them into electrical analog signals.

4. A communication system for secure, long-distance communication between marine vessels comprising, in combination: means for generating electrical signals of a predetermined frequency; a linear vertical transducer array disposed within the oceanic deep sound channel for transforming said electrical signals into sonic analog signals and radiating said sonic signals in a directional beam within the sound channel, said array comprising a plurality of electrically connected transducers spaced from each other and arranged in a straight line; and means disposed within the sound channel for receiving said sonic signals and converting them into electrical analog signals.

5. A communication system for secure, long-distance communication between marine vessels comprising, in combination: means for generating electrical signals of a predetermined frequency; a transducer array disposed within the oceanic deep sound channel for transforming electrical signals into sonic analog signals and radiating said sonic signals in a directional beam within the sound channel; a transducer array disposed within the sound channel for transforming said sonic signals into electrical analog signals; and means for converting said electrical analog signals into intelligible indications.

6. A communication system for secure, long-distance communication between marine vessels comprising, in combination: means for generating electrical signals of a predetermined frequency; a transducer array disposed near the axis of the oceanic deep sound channel for transforming electrical signals into sonic analog signals and radiating said sonic signals in a directional beam within the sound channel; a transducer array disposed near the axis of the sound channel for transforming said sonic signals into electrical analog signals; and means for converting said electrical analog signals into intelligible indications.

7. A communication system for secure, long-distance communication between marine vessels comprising, in combination: means for generating electrical signals of a predetermined frequency within the 1000 to 2000 cycle per second range; a transducer array disposed within the oceanic deep sound channel for transforming said electrical signals into sonic analog signals and radiating said sonic signals in a directional beam within the sound channel; a transducer array disposed with the sound channel for transforming said sonic signals into electrical analog signals; and means for converting said electrical analog signals into intelligible indications.

8. A communication system for secure, long-distance communication between marine vessels comprising, in combination: means for generating electrical signals of a predetermined frequency; a linear vertical transducer array disposed within the oceanic deep sound channel for transforming said electrical signals into sonic analog signals and radiating said sonic signals in a directional beam within the sound channel, said array comprising a plurality of electrically connected transducers spaced from each other and arranged in a straight line; a linear vertical transducer array disposed within the sound channel for transforming said sonic signals into electrical analog signals, said array comprising a plurality of electrically connected transducers spaced from each other and arranged in a straight line; and means for converting said electrical analog signals into intelligible indications.

9. A system as set forth in claim 8, wherein the individual transducers in said transducer arrays comprise cylindrical barium titanate crystals.

10. A system as set forth in claim 8, wherein said plurality in each array consists of at least twenty-three transducers.

11. A communication system for secure, long-distance communication between marine vessels comprising, in combination:
means for generating electrical signals of a predetermined frequency;
a narrow beam transducer array disposed within the oceanic deep sound channel for transforming said electrical signals into sonic analog signals and radiating said sonic signals in a directional beam within the sound channel; and
means disposed within the sound channel for receiving said sonic signals and converting them into electrical analog signals.

12. A communication system for secure, long-distance communication between marine vessels comprising, in combination:
means for generating electrical signals of a predetermined frequency;
a narrow beam transducer array disposed near the axis of the oceanic deep sound channel for transforming said electrical signals into sonic analog signals and radiating said sonic signals in a directional beam within the sound channel; and
means disposed near the axis of the sound channel for receiving said sonic signals and converting them into electrical analog signals.

13. A communication system for secure, long-distance communication between marine vessels comprising, in combination:
means for generating electrical signals of a predetermined frequency within the 1000 to 2000 cycle per second range;
a transducer array disposed within the oceanic deep sound channel for transforming said electrical signals into sonic analog signals and radiating said sonic signals in a narrow directional beam within the sound channel; and
means disposed within sound channel for receiving said sonic signals and converting them into electrical analog signals.

14. A communication system for secure, long-distance communication between marine vessels comprising, in combination:
means for generating electrical signals of a predetermined frequency;
a linear vertical transducer array disposed within the oceanic deep sound channel for transforming said electrical signals into sonic analog signals and radiating said sonic signals in a narrow directional beam within the sound channel, said array comprising a plurality of electrically connected transducers spaced from each other and arranged in a straight line;
and means disposed within the sound channel for receiving said sonic signals and converting them into electrical analog signals.

15. A communication system for secure, long-distance communication between marine vessels comprising, in combination:
means for generating electrical signals of a predetermined frequency;
a narrow beam transducer array disposed within the oceanic deep sound channel for transforming electrical signals into sonic analog signals and radiating said sonic signals in a directional beam within the sound channel;
a transducer array disposed within the sound channel for transforming said sonic signals into electrical analog signals; and
means for converting said electrical analog signals into intelligible indications.

16. A communication system for secure, long-distance communication between marine vessels comprising, in combination:
means for generating electrical signals of a predetermined frequency;
a narrow beam transducer array disposed near the axis of the oceanic deep sound channel for transforming electrical signals into sonic analog signals and radiating said sonic signals in a directional beam within the sound channel;
a transducer array disposed near the axis of the sound channel for transforming said sonic signals into electrical analog signals; and means for converting said electrical analog signals into intelligible indications.

17. A communication system for secure, long-distance communication between marine vessels comprising, in combination:
- means for generating electrical signals of a predetermined frequency within the 1000 to 2000 cycle per second range;
- a narrow beam transducer array disposed within the oceanic deep sound channel for transforming said electrical signals into sonic analog signals and radiating said sonic signals in a directional beam within the sound channel;
- a transducer array disposed with the sound channel for transforming said sonic signals into electrical analog signals; and
- means for converting said electrical analog signals into intelligible indications.

18. A communication system for secure, long-distance communication between marine vessels comprising, in combination:
- means for generating electrical signals of a predetermined frequency;
- a linear vertical transducer array disposed within the oceanic deep sound channel for transforming said electrical signals into sonic analog signals and radiating said sonic signals in a narrow directional beam within the sound channel, said array comprising a plurality of electrically connected transducers spaced from each other and arranged in a straight line;
- a linear vertical transducer array disposed within the sound channel for transforming said sonic signals into electrical analog signals, said array comprising a plurality of electrically connected transducers spaced from each other and arranged in a straight line; and
- a means for converting said electrical analog signals into intelligible indications.

19. A system as set forth in claim 18, wherein the individual transducers in said transducer arrays comprise cylindrical barium titanate crystals.

20. A system as set for in claim 18, wherein said plurality in each array consists of at least twenty-three transducers.

* * * * *